June 13, 1944.  H. W. HOUSTON  2,351,337
FILM MEASURING APPARATUS
Filed Aug. 11, 1941
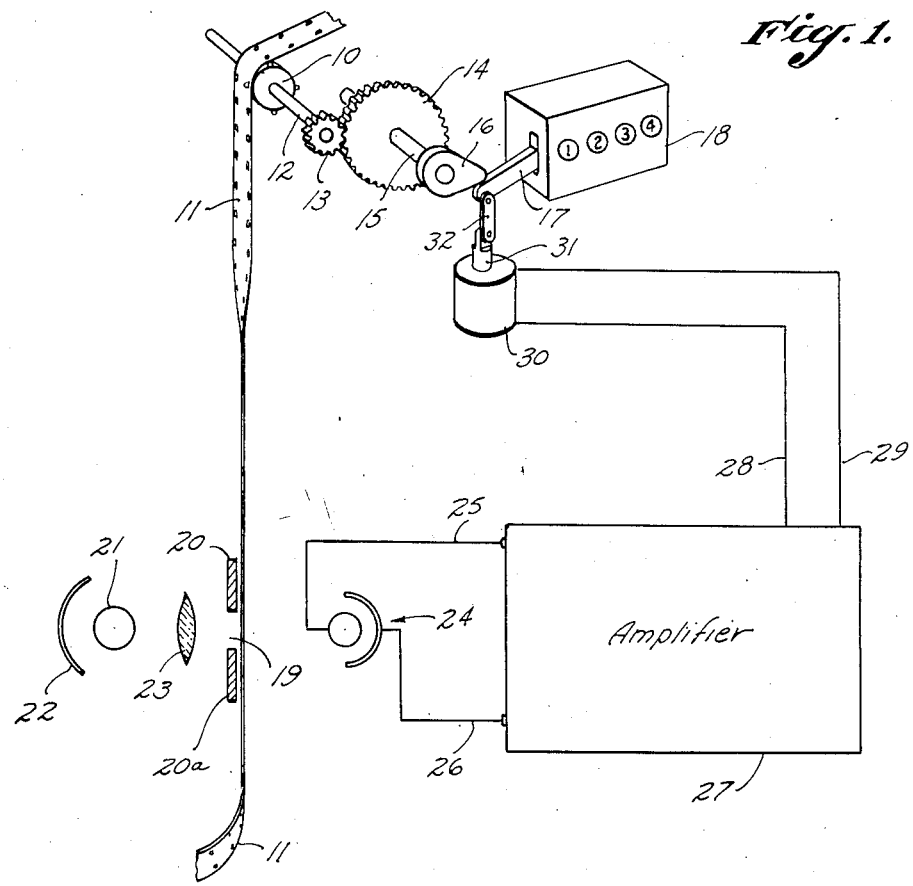
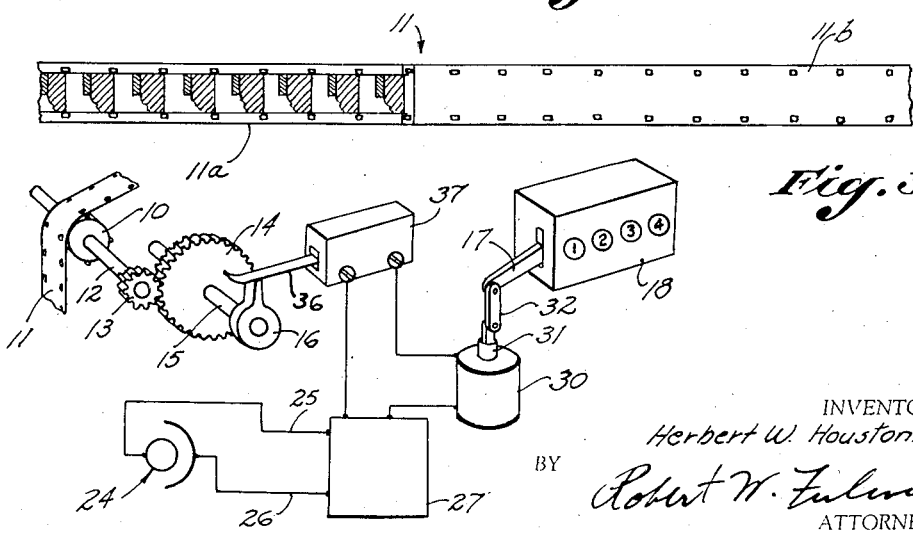
INVENTOR.
Herbert W. Houston,
BY
Robert W. Fulwider
ATTORNEY.

Patented June 13, 1944

2,351,337

UNITED STATES PATENT OFFICE 2,351,337

FILM MEASURING APPARATUS

Herbert W. Houston, North Hollywood, Calif.

Application August 11, 1941, Serial No. 406,345

3 Claims. (Cl. 33—125)

My invention relates generally to the art of treating photographic films, and more particularly to the treatment of long strips of film, such, for example, as are used in motion picture cameras, aerial cameras and the like.

In commercial laboratories it is of prime importance to be able to accurately determine the number of feet of exposed film which pass through the machines, since the charge for developing, etc., is usually made on a footage basis.

Likewise, when treating film by the batch method where the solutions are replenished or renewed after they have been exhausted to a predetermined point, it is essential to know when the allowable amount of film has passed through the solutions.

In each of these cases the use of "leader" on the ends of the film roll creates a difficult problem in counting footage, since ordinary counters register "leader" footage along with developed film footage. This is particularly disadvantageous in daylight developing machines where access to the interior of the machine cannot be had during its operation.

My invention is particularly directed to the solution of this troublesome problem, and one of the major objects of my invention is to provide a footage counting method and apparatus which will distinguish between leader and photographic film in any of its various stages.

Another object of my invention is to provide a footage counting apparatus which is extremely accurate, but simple in its construction and operation, and which can be adapted for use with various types of film treating machines.

A further object of my invention is to provide a counting apparatus which is primarily electrical, has a minimum of moving parts, and which therefore is extremely unlikely to get out of order.

These and other objects and advantages of my invention will become apparent from the following description of a preferred form thereof and from an inspection of the accompanying drawing in which:

Fig. 1 is a schematic view partly in perspective, illustrating the essential parts of one form of my novel apparatus, Fig. 2 is a plan view of a strip of photographic film with a length of leader attached to one end thereof, and Fig. 3 is a schematic view of a modified form of counting apparatus.

Referring now to the drawing and particularly to Fig. 1 thereof, the numeral 10 indicates a conventional sprocket around which a film strip 11 passes from or to a film treating machine not shown. The sprocket 10 is keyed to a shaft 12 which carries a gear 13 adapted to mesh with a gear 14 mounted on a shaft 15. A crank-type cam 16 is mounted on the other end of shaft 16 and is adapted to engage and move an arm 17 which in turn actuates a counter 18 in conventional manner.

As will be apparent from the foregoing, passage of the film 11 around the sprocket 10 causes the cam 16 to rotate and move the counter arm 17 once for each revolution of the cam. By properly proportioning the sprocket and gear ratios, the arm 17 may be actuated once for each foot of film which passes around the sprocket 10.

After leaving the sprocket 10 the film 11 passes across an aperture plate 20—20a having an aperture 19 therein. Abreast of the aperture 19 I provide a source of electromagnetic radiations such, for example, as a lamp 21, having a reflector 22 and a condenser lens 23 associated therewith so as to direct a beam of light through the aperture 19.

Aligned with the aperture 19 and light source 21 is a radiometer such as a photo-cell 24 which is connected by suitable leads 25 and 26 to an amplifier 27 which is in turn connected by leads 28 and 29 to an electromagnet 30 having an armature 31. A link 32 pivotally connects armature 31 with counter arm 17 so that energization of the solenoid 30 will pull the arm 17 down out of engaging position with cam 16 and thus disconnect the counter from the film sprocket 10.

In Fig. 2 I have shown a strip 11 which is made up of a section of photographic film 11a having images thereon, and a section of clear leader 11b of conventional type. As is well known in the art, in order to properly operate a film treating machine in which the film has any extended travel, it is advantageous to keep the machine threaded with leader when it is not operating. When it is desired to operate the machine, the film to be treated is connected to the rear end of the leader and pulled through the machine in its proper course. When the end of the film has been reached, a roll of leader is spliced to the tail end of the film and pulled into the machine so that when the machine is stopped and the treated film removed, the machine is threaded up ready for the next run of film.

The average leader is formed of ordinary film base stock without any light sensitive emulsion on it, and is consequently clear, although colored leader is often used, to more easily distinguish it from the film being treated. On the other hand, photographic film, carrying images thereon, such, for example, as the section 11a, has portions in each frame which have appreciable density, and usually at least a part of each frame has considerable density. It is upon this distinguishing difference in the light transmitting properties of the film being treated and the leader attached thereto, that my invention is based.

Assuming for the sake of example that the film 11 passing over the sprocket 10 has just come from a developing or fixing bath and has images thereon of appreciable density as illustrated in Fig. 2, when it passes the aperture 19, the beam of light from source 21 which normally strikes the photocell 24 will be interrupted and no current will flow in the amplifier solenoid circuits. Consequently, the counter arm 17 is allowed to remain in its normal operating position where it is actuated by the cam 16 once every revolution thereof, and the footage of the developed film passing over sprocket 10 is recorded by the counter 18.

However, when the last of the image bearing film 11a has passed the aperture 19 and the clear leader 11b passes across the aperture, there is no longer any obstruction to the passage of light to the photocell 24, and consequently current is caused to flow in the circuit, the solenoid 30 is energized, and the counter arm 17 is pulled down out of the path of cam 16, so that further rotation of sprocket 10, by reason of the passage of leader thereover, does not operate the counter. By this means, the exact amount of developed film footage passing through the machine is accurately recorded without the necessity of correcting for the amount of leader passing through the machine.

As previously mentioned, this is particularly valuable in batch machines such as are used in the development of aerial photographs made on strip film, since it is known that a single batch of developer will handle a certain number of feet of film, and when that footage has passed through the machine the developer can be dumped with the knowledge that it has been exhausted to just the right point.

In the modified form of counter shown in Fig. 3 the numerals 10, 12, 13, and 14 again indicate a sprocket, shaft, and gears, respectively. In this form of my invention, however, the cam 16 engages a switch arm 36 and causes it to close a switch 37 once each revolution of the sprocket 10. The solenoid 30 is connected in series with the switch 37 and the amplifier 27, and is arranged so that its armature 31 directly operates the counter arm 17 through link 32 to actuate the counter 18. The relay in the amplifier 27 is adjusted so that as long as photographic film is passing the photocell 24 there is current available in the solenoid circuit, and, consequently, the counter will operate in response to travel of the film around the sprocket 10. However, when clear leader passes between the light source 21 and the photocell 24, the current in the solenoid circuit is shut off so that the solenoid will not operate, even when the switch 37 is closed. In other words, material variation in the light passing through the strip 11 causes the counter to be rendered inoperative, just as effectively as in the first case described.

It will be understood, of course, that the particular arrangement of parts specifically shown and described herein is merely illustrative of the various arrangements which can be made in following out my invention. For example, the optical part of the system may be placed on either side of the mechanical part of the system, and various types of radiometers, amplifiers and electromagnets can be used, as well as modified forms of counters, both mechanical and electrical, all within the scope of the appended claims.

I claim:

1. An apparatus for measuring the length of photographic film in a combined strip of film and leader of materially different densities which includes: a source of electromagnetic radiations; a radiometer disposed in the path of said radiations and responsive thereto; means for moving said strip through the path of said radiations so as to vary the flow thereof to said radiometer; means responsive to the movement of said strip for indicating the footage thereof passing said radiometer, which said means includes a sprocket over which said film travels, and a rotating cam connected to said sprocket and adapted to operate a counter; and an electromagnet connected in circuit with said radiometer and adapted to disconnect said counter when said film ceases to pass said radiometer but said leader is passing said radiometer.

2. An apparatus for measuring the length of photographic film in a combined strip of film and leader of materially different densities, which includes: a source of electromagnetic radiations; a radiometer disposed in the path of said radiations and responsive thereto; means for moving said strip across the path of said radiations so as to vary the flow thereof to said radiometer; means responsive to the movement of said strip for indicating the footage thereof passing said radiometer, which said means includes a rotating cam operated by the movement of said strip and adapted to operate a counter; and an electromagnet connected in circuit with said radiometer and adapted to disconnect said counter when said film ceases to pass said radiometer but said leader is passing said radiometer.

3. An apparatus for measuring the length of photographic film in a combined strip of film and leader of materially different densities, which includes: a source of electromagnetic radiations; a radiometer disposed in the path of said radiations and responsive thereto; means for moving said strip across the path of said radiations so as to vary the flow thereof to said radiometer; a rotatably mounted element actuated by the movement of said strip and adapted to operate a footage counting device; and means in circuit with said radiometer for rendering said counting device inoperative when film ceases to pass said radiometer, but leader is passing said radiometer.

HERBERT W. HOUSTON.